United States Patent [19]

Kervagoret et al.

[11] Patent Number: 4,953,445
[45] Date of Patent: Sep. 4, 1990

[54] CONTROL DEVICE WITH FAILURE DETECTION CENTERING FOR A DOUBLE-ACTING HYDRAULIC JACK

[75] Inventors: Gilbert Kervagoret, Argenteuil; Christian Tanguy, Frepillon, both of France

[73] Assignee: Bendix France, Drancy, France

[21] Appl. No.: 326,956

[22] Filed: Mar. 22, 1989

[30] Foreign Application Priority Data

Mar. 25, 1988 [FR] France ............... 88 03911

[51] Int. Cl.$^5$ ............................................. F15B 13/16
[52] U.S. Cl. ............................... 91/358 A; 91/360; 91/358 R; 60/404; 60/405; 60/406
[58] Field of Search ............... 60/404, 405, 406, 306; 91/358 A, 358 R, 360, 368

[56] References Cited

U.S. PATENT DOCUMENTS

| | | | |
|---|---|---|---|
| 2,969,044 | 1/1961 | Leduc | 91/368 |
| 3,776,099 | 12/1973 | Knutson | 91/358 A |
| 4,085,587 | 4/1978 | Garlinghouse | 60/404 X |
| 4,335,867 | 6/1982 | Bihlmaier | 91/360 X |
| 4,410,193 | 10/1983 | Howard | 91/368 X |
| 4,647,004 | 3/1987 | Bihlmaier | 60/406 X |
| 4,666,013 | 5/1987 | Shibahata et al. | 91/368 X |
| 4,718,869 | 1/1988 | Fisher | 91/358 R X |
| 4,732,231 | 3/1988 | Kanazawa et al. | 91/378 X |
| 4,770,264 | 9/1988 | Wright et al. | 91/45 X |
| 4,884,647 | 12/1989 | Mimuro et al. | 91/536 X |

FOREIGN PATENT DOCUMENTS

| | | |
|---|---|---|
| 0225773 | 6/1987 | European Pat. Off. . |
| 0243180 | 10/1987 | European Pat. Off. . |
| 2589419 | 5/1987 | France . |
| 59-128054 | 7/1984 | Japan . |
| 59-128055 | 7/1984 | Japan . |
| 61-67671 | 4/1986 | Japan . |
| 61-108065 | 5/1986 | Japan . |
| 61-175182 | 8/1986 | Japan . |
| 1185324 | 3/1970 | United Kingdom .............. 91/368 |

Primary Examiner—Carl D. Price
Assistant Examiner—John E. Ryznic
Attorney, Agent, or Firm—Larry J. Palguta; Ken C. Decker

[57] ABSTRACT

The invention relates to the control of a hydraulic jack which can be used, for example, for controlling the orientation of the rear wheels of a vehicle with front guiding wheels. In the event of a failure in the supply of fluid under pressure to the chambers (3, 4) of the jack, these chambers are isolated and the piston (2) is maintained in the position which it occupied when the failure occurred, by means of non-return valves (12). However, when certain conditions are satisfied, for example a sufficiently low speed, the electronic control member (20) activates an auxiliary circuit (30 to 39) in order to return the piston to its middle position and allow driving of the conventional kind with the rear wheels in line.

11 Claims, 2 Drawing Sheets

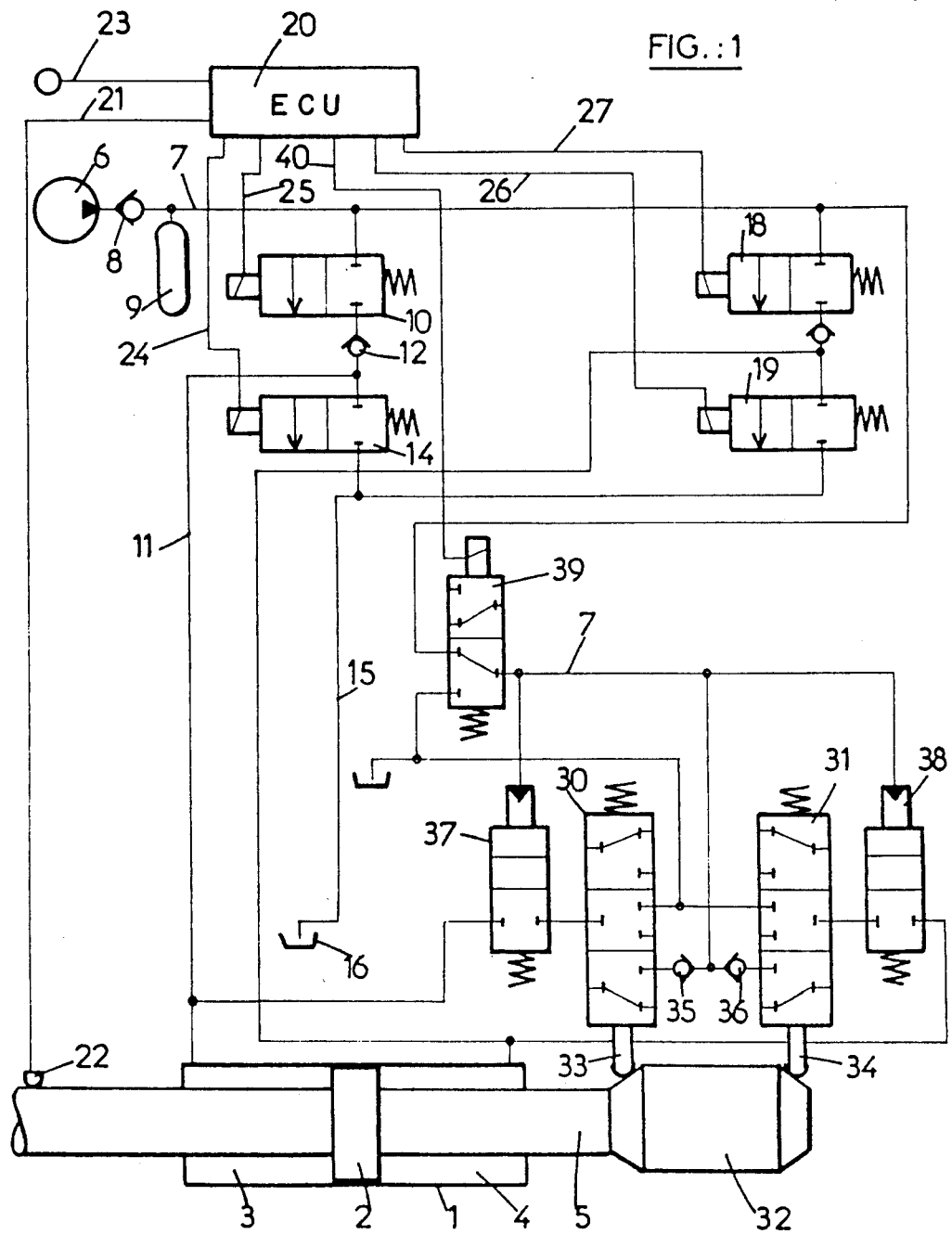
FIG.:1

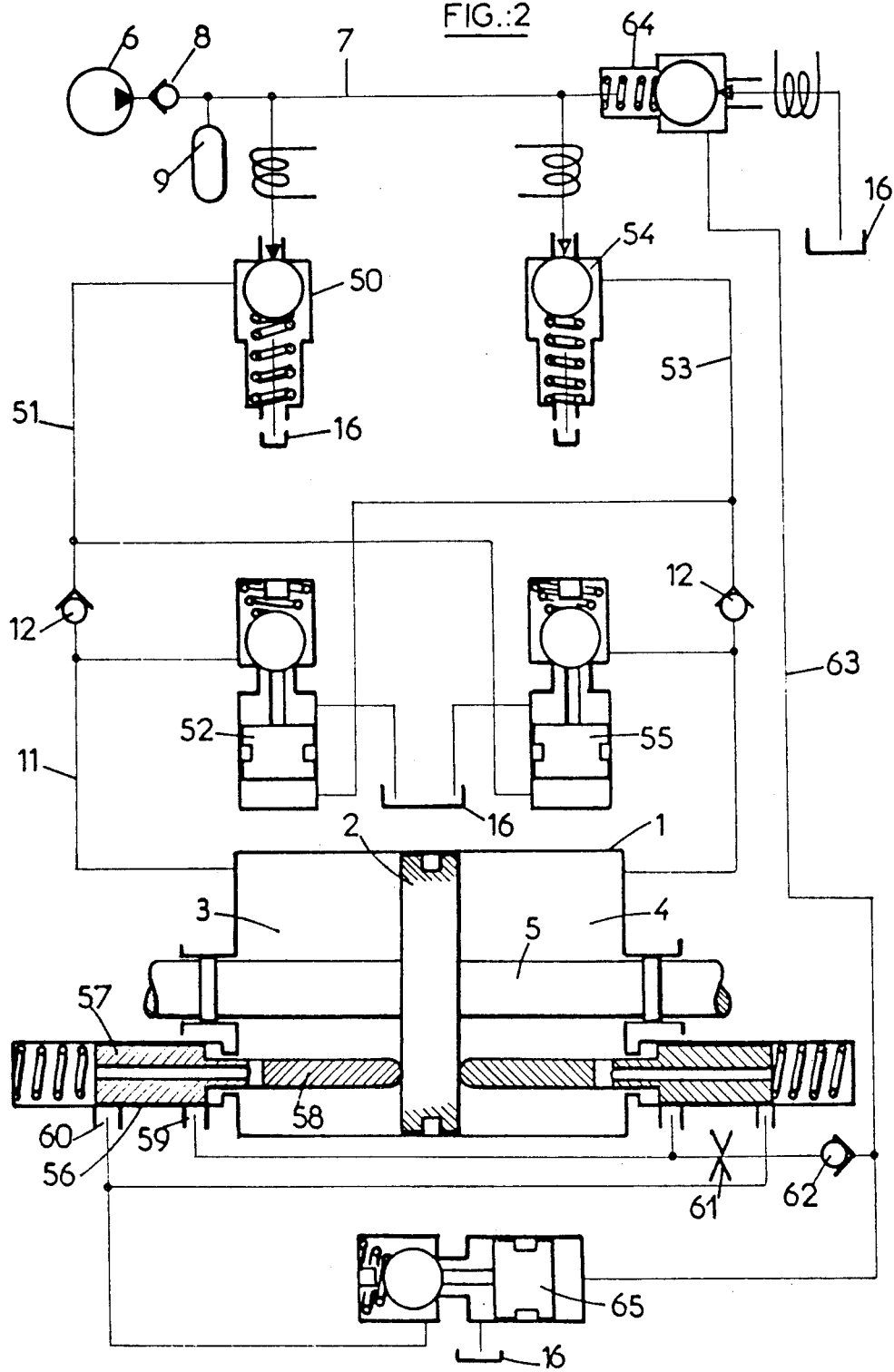

CONTROL DEVICE WITH FAILURE DETECTION CENTERING FOR A DOUBLE-ACTING HYDRAULIC JACK

FIELD OF THE INVENTION

The present invention relates to a control device for a double-acting hydraulic jack, which device can be used particularly in the control of a system for orienting the rear wheels of a motor vehicle with front guiding wheels.

To control the changes in orientation of the rear wheels of a motor vehicle simultaneously or not with the movements of the front wheels, various systems have been proposed. It is logical to think of using a double acting hydraulic jack comprising a distributor acting in response to the pulses from an electronic control member.

Of course, particular attention must be given to questions of safety. When the vehicle, travelling at high speed, has gone into a bend, a sudden failure in the hydraulic supply or the electrical supply must not cause any sudden change in the orientation of the rear wheels, which could surprise the driver and have unforeseeable consequences. On the other hand, should the hydraulic system fail when the vehicle is stationary or travelling at low speed, it is advantageous to ensure that the wheels return to the direction parallel to the axis of the vehicle, so that the latter can continue on its way, being driven in the same way as a conventional vehicle with rear wheels of fixed orientation.

SUMMARY OF THE INVENTION

The main object of the present invention is to provide a control device acting in the way just described in the event of failure of the hydraulic supply-pressure source, that is to say, for example, a breakdown of the pump or a break in a feedpipe, but this device being of simple and inexpensive construction.

To obtain this result, the invention provides a control device for a double-acting hydraulic jack, comprising a distributor assembly controlling the selective connection of each of the two chambers of the jack to a pressure source or to a pressureless tank, this distributor assembly being controlled by an electronic control member, the particular feature of which is that it includes a main circuit comprising means for isolating the chambers of the jack from the tank and from the pressure source in the event of failure of the latter, with the result that the piston of the jack is immobilized in the position which it occupied before the failure, and that it also includes an auxiliary circuit comprising means for selectively connecting one of the chambers to the pressure source and the other to the tank, these means being controlled by a sensor sensitive to the position of the piston of the jack, so as to return the piston to a middle position, these means being operated only when there is simultaneously a failure of the pressure source and an appropriate signal emitted by the control member.

It will be seen that the distributor assembly comprises two separate circuits, namely a main circuit which normally controls the jack and which blocks the piston of the latter in the position which it occupies at the moment when failure occurs, and an auxiliary circuit which, when it receives an appropriate signal emitted by the control member, returns the piston to its middle position. The signal emitted by the control member in this case can correspond either to a zero speed of the vehicle or to a low speed with a wheel orientation near the axis of the vehicle.

Preferably, the auxiliary circuit possesses means for slowing the return of the piston to its position. These means can comprise a restriction located on the means selectively connecting one or other of the chambers to the pressure source and/or on the means selectively connecting one or other of the chambers to the tank.

If such slowing means are provided, it is possible for the complete failure of the electronic control member to cause the activation of the second circuit. Otherwise, it is preferable if, when there is a complete failure of the control member, only the means of the main circuit act to isolate the chambers of the jack and block the piston.

As regards the main distribution circuit, according to a first embodiment it comprises for each chamber of the jack:

- a first solenoid valve which, in a first position, connects the chamber directly to the pressure source and, in a second position, isolates the chamber from the pressure source,
- a second solenoid valve which, in a first position, connects the chamber directly to the tank and, in a second position, isolates the chamber from the tank,
- a non-return valve which is associated with the first solenoid valve and which opposes the passage of fluid towards the pressure source if the pressure of the latter is below a given value, and the control member acts on the solenoid valves either to maintain them all in the second position or to bring the first solenoid valve of one chamber and the second solenoid valve of the other chamber simultaneously into the first position, or vice versa, according to the instructions received, and acts to maintain all the solenoid valves in the second position when a failure of the pressure source is detected.

According to another embodiment, the main control circuit comprises, for each jack chamber:

- a three-way solenoid valve which, in a first position, connects a feed pipe to the pressure source and, in a second position, connects the feed pipe to the tank,
- a controlled valve means which puts the chamber in communication with the tank when the feed pipe of the other chamber is connected to the pressure source,
- and a non-return valve which is placed between the chamber and the solenoid valve and which prevents the fluid from flowing from the chamber towards the feed pipe when the pressure in the latter falls below a selected value, and the control member acts on the solenoid valves either to maintain them together in the first position or to bring the solenoid valve of one chamber into the first position and the solenoid valve of the other chamber into the second position simultaneously, or vice versa, as a function of the instructions received, and acts to maintain the solenoid valves in the second position when a failure of the pressure source is detected.

It is possible to ensure that the solenoid valve or solenoid valves of each chamber has or have a third position which isolates the chamber completely from the pressure source and from the tank, and that they assume this third position automatically in the event of failure of the pressure source and/or of the electronic control member. The non-return valve can then be either omitted or preserved in order to provide a safety back up.

As regards the auxiliary distribution circuit, according to a first embodiment it comprises, for each chamber of the jack, a slide valve designed to put the chamber in communication either with the tank or with the pressure source these valves being controlled by the position of the piston of the jack, in such a way that, if the piston is away from a middle position, the pressure difference in the chambers tends to return it to this middle position, and means, controlled by the control member, for isolating the two chambers of said valves or for isolating said valves from the tank and from the pressure source.

According to another embodiment of the auxiliary control circuit, the means for isolating the two chambers comprise a solenoid valve capable of connecting an auxiliary pipe either to the tank or to the pressure source, this auxiliary pipe being connected to the valves via a valve means which closes when the auxiliary pipe is connected to the tank, and the auxiliary pipe being connected, on the other hand, to a controlled valve means which connects the valves to the tank when the auxiliary pipe is under pressure and which isolates them from it when the auxiliary pipe is connected to the tank. Preferably, in this case, the means for isolating the two chambers comprise an isolating valve located between each chamber and the corresponding slide valve, these isolating valves being actuated by the pressure of the pressure source, to which they are connected via a solenoid valve, itself controlled by the control member.

These two embodiments are not completely equivalent, the second being simpler and more economical, but having response times a little shorter than the first.

BRIEF DESCRIPTION OF THE DRAWINGS

The invention will now be described with the aid of practical examples of embodiment, illustrated in the drawings in which:

FIG. 1 shows a theoretical diagram of a first embodiment according to the invention, and FIG. 2 shows a theoretical diagram of a second embodiment according to the invention.

The devices of FIGS. 1 and 2 each comprise a main control circuit and an auxiliary control circuit. It is stated specifically here that there is nothing to prevent the auxiliary control circuit of the second example from being associated with the main control circuit of the first example, and vice versa.

In the two examples, the same members bear the same references.

A double-acting jack 1 is divided by means of a piston 2 into two chambers 3 and 4 of variable volume. The piston is mounted on a rod 5. The hydraulic supply is ensured by a pump 6 connected to a feed pipe 7 via a nonreturn valve 8. The feed pipe 7 is also connected to a pressure accumulator 9.

The main control circuit has, for the chamber 3, a first solenoid valve 10 which is connected, on the one hand, to the high-pressure pipe 7 and, on the other hand, to the feed pipe 11 of the chamber 3 via a non-return valve 12 which opposes the passage of the fluid contained in the pipe 11 towards the solenoid valve 10, if the pressure difference between these members exceeds a predetermined value.

The solenoid valve 10 in one position connects the pipe 7 directly to the non-return valve 12 and in the other position isolates it from this valve.

A second solenoid valve 14 connects the feed pipe 11 of the chamber 3 to a pipe 15 leading to the tank 16 or isolates it from this pipe.

That part of the main control circuit which relates to the second chamber 4 of the jack comprises two solenoid valves 18, 19 arranged in exactly the same way as the solenoid valves 10 and 14, so that there is no need to describe them in more detail.

The main control device is controlled by a micro processor or electronic control unit (ECU) 20 having several inputs, of which one 21 is connected to a position sensor 22 sensitive to the position of the piston 2 in the jack 1. Other inputs symbolized at 23 supply the microprocessor with information corresponding, for example, to the angle of the front wheels, to the speed of the vehicle, to the operation of the pump 6 etc.. The processor has, among other things, four outputs 24, 25, 26, 27 which each control one of the solenoid valves 10, 14, 18, 19. If, for example, a certain angle is detected on the front wheels, the processor or ECU 20 will simultaneously command the opening of the solenoid valves 10 and 19 which put the chambers 3 and 4 respectively in communication with the high-pressure pipe 7 and the discharge pipe 15. This will cause a movement of the piston 2 until the detector 22 has ascertained that the position of this piston and consequently of the controlled rear wheels corresponds to the instruction.

If it is assumed that, during the operation, there is a sudden failure in the high-pressure circuit, for example a break in the pipe 7, the corresponding pressure drop will cause the activation of the non-return valve 12. The chamber 3 will then be isolated and the piston 2 immobilized substantially in the position which it occupies at the moment when the breakdown has occurred.

The auxiliary control circuit is intended for returning the piston of the jack to its middle position in the event of a breakdown of the pressure supply system, provided that certain requirements are met, for example a very low speed.

It comprises two distributors 30, 31 with closed centers, which are assigned one to the first chamber 3 of the jack and the other to the second chamber 4.

These distributors are controlled mechanically by means of a cam 32 integral with the shaft 5 carrying the piston 2. When the cam 32 is in a middle position, cam followers 33, 34 controlling the distributors 30 and 31 maintain the latter in the central closing position. When the cam is moved, together with the piston 2, towards the left or towards the right, for example the chamber 3 is put into communication with the high-pressure feed pipe 7 and the chamber 4 into communication with the tank 16. Non-return valves 35, 36 prevent one or other of the chambers from discharging completely into the feed pipe 7 in the event of too great a pressure drop in the latter.

The connection between the distributors 30, 31 and corresponding chambers 3, 4 is controlled by two hydraulic valves 37, 38 inserted between the distributor 30, 31 and the corresponding chamber 3, 4. These hydraulic valves 37, 38 are themselves controlled by a solenoid valve 39 which sends the pressure contained in the pressure accumulator 9 to their control pistons. This operation takes place only on the command of the microprocessor 20 transmitted via a special output 40.

Under normal circumstances, the chambers 3 and 4 are therefore isolated from the auxiliary control system by the hydraulic valves 37, 38. It will be appreciated that the solenoid valve 39 is actuated by means of the output 40 only if the processor or ECU 20 has detected the conditions necessary for this actuation, that is to say simultaneously a failure of the pressure supply and, for example, a low or zero speed of the vehicle.

It will be seen that the auxiliary control device does not function if the solenoid valve 39 is deprived of pulses, that is to say if the processor 20 is inoperative.

FIG. 2 relates to a device possessing an alternative version of the main control circuit and an alternative version of the auxiliary control circuit.

The main control circuit comprises, for the chamber 3, a three-way solenoid valve 50 which puts a pipe 51 in communication either with the high-pressure pipe 7 or with the tank 16. When the solenoid valve 50 is not excited, it puts the pipe 51 in communication with the tank.

The pipe 51 is connected via a non-return valve 12 to the feed pipe 11 in the chamber 3. The pipe 11 is likewise connected to the tank by means of a controlled valve means 52. This valve means is controlled by the pressure prevailing in the pipe 53 symmetrical relative to the pipe 51 and located in the circuit corresponding to the second chamber 4 of the jack. If the solenoid valve 54 symmetrical relative to the solenoid valve 50 and controlling the pressure in the second chamber 4 is controlled, the pressure in the pipe 53 causes the valve means 52 to open and the chamber 3 to be put in communication with the tank. Conversely, if the solenoid valve 50 is excited, the pressure in the pipe 51 controls the opening of a valve means 55 which puts the chamber 4 in communication with the tank. Thus, the chambers 3 and 4 are alternately one under pressure and the other connected to the tank. However, if both solenoid valves 50, 54 are at rest, the two chambers 3 and 4 are maintained under pressure as a result of the closing of the valve means 52, 55 and the non-return valves 12. If the pressure were to fall in the high-pressure pipes 7 during a maneuver, this would cause the closing of the valve means 52 or 55 which would be open and consequently the automatic isolation of the chambers 3 and 4.

The auxiliary control circuit comprises, for each chamber, a distributor 56 which is mounted directly on one end of the jack 1 and the slide 57 of which is controlled by a pusher 58 bearing directly on the piston 2.

The distributor 56 has a high-pressure inlet 59 and a low-pressure outlet 60. When the slide is in the middle position, the inlet 59 and the outlet 60 are closed off. When the slide is moved towards the left in FIG. 2, the inlet 59 communicates with the interior of the chamber 3, and when the slide is moved towards the right the chamber 3 is put into communication with the outlet 60 via an axial bore in the slide.

The inlet 59 is connected to the high-pressure pipe 7 by means of a restriction 61, a non-return valve 62, a pipe 63 and a solenoid valve 64. The outlet 60 is connected to the tank 16 by means of a valve means 65 which opens only when the pressure in the pipe 63 is sufficient.

The solenoid valve 64 is a three-way solenoid valve which puts the pipe 63 in communication with the tank 16 when it is excited and with the high-pressure pipe 7 only when it is not excited under the control of the processor 20.

Under normal circumstances, the solenoid valve 64 is excited, with the result that the chamber 3 is isolated from the tank as a result of the simultaneous closing of the non-return valve 62 and of the valve means 65. The same is true of the chamber 4, which means that the auxiliary control circuit is inactive.

If the solenoid valve 64 is not excited, the pipe 63 is connected to the high-pressure pipe 7, and even if the pressure in the latter is below normal it is not zero because of the presence of the pressure accumulator 9 and the non-return valve 8. As a result, the valve means 65 is opened. The result of a movement of the piston causing a movement of the slide is that one of the chambers 3, 4 is connected to the high-pressure pipe 7 and the other to the tank 16, and the force generated tends to return the piston to its middle position. The restriction 61 prevents the return from occurring abruptly.

It will be seen that, in this arrangement, in contrast to that of FIG. 1, the control device functions in the event that the solenoid valve is not excited as a result of a stop in the operation of the processor 20. The return of the piston to the middle position takes place progressively, because of the presence of the restriction 61, and therefore without the risk of surprising the driver of the vehicle.

What we claim is:

1. A control device for a double-acting hydraulic jack, comprising:
    a distributor assembly controlling the selective connection of each of two chambers of the jack to one of a pressure source and a pressureless tank, said distributor assembly being controlled by an electronic control member,
    a main circuit comprising means for isolating the chambers of the jack from the tank and from the pressure source in the event of failure of said source, with the result that a piston of the jack is immobilized in a position which it occupied before the failure, and an auxiliary circuit comprising means for selectively connecting one of the chambers to the pressure source and the other chamber to the tank,
    the means being controlled by a sensor sensitive to the position of the piston of the jack so as to return the piston to a middle position, and being operated only when there is simultaneously a failure of the pressure source and an appropriate signal emitted by said control member.

2. The device according to claim 1, wherein said auxiliary circuit comprises means for slowing the return of the piston of the jack to the middle position.

3. The device according to claim 2, wherein said slowing means comprises a restriction located on the means selectively connecting one of the chambers to the pressure source and the other of the chambers to the tank.

4. The device according to claim 1, wherein a complete failure of the electronic control member causes the activation of the means for returning the piston to a middle position.

5. The device according to claim 1, wherein a complete failure of the control member causes the isolation of the chambers of the jack and the immobilization of said piston.

6. The device according to claim 1, comprising for each chamber of the jack;
    a first solenoid valve which, in a first position, connects the chamber directly to the pressure source and, in a second position, isolates the chamber from the pressure source, a second solenoid valve which, in a first position, connects the chamber directly to the tank and, in a second position, isolates the chamber from the tank, a non-return valve which is associated with the first solenoid valve and which opposes the passage of fluid towards the pressure source if the pressure of said pressure source is below a given value, and wherein the control member acts on the solenoid valves to cause one of maintaining valves in the second position and to bring the first solenoid valve of one chamber and the second solenoid valve of the other chamber simultaneously into the first position, according to the instructions received, and acts to maintain all the solenoid valves in the second position when a failure of the pressure source is detected.

7. The device according to claim 1, comprising for each chamber of the jack ;

a three-way solenoid valve which, in a first position, connects a feed pipe to the pressure source and, in a second position, connects the feed pipe to the tank, controlled valve means which puts the chamber in communication with the tank when the feed pipe of the other chamber is connected to the pressure source, a non-return valve placed between the chamber and the solenoid valve and which prevents the fluid from flowing from the chamber towards the feed pipe when the pressure in the latter falls below a selected value, and wherein the control member acts on the solenoid valves to cause one of maintaining the solenoid valves in the first position and to bring the solenoid valve of one chamber into the first position and the solenoid valve of the other chamber into the second position simultaneously, as a function of the instructions received, and acts to maintain the solenoid valves in the second position when a failure of the pressure source is detected.

8. The device according to claim 7, wherein the solenoid valve of each chamber has a third position which isolates the chamber completely from the pressure source and from the tank, the non-return valve then being omitted where appropriate.

9. The device according to claim 1, also comprising, for each chamber of the jack, a slide valve designed to put the chamber in communication with one of the tank and with the pressure source, the slide valves being controlled by the position of the piston of the jack in such a way that, if the piston is away from the middle position, the pressure difference in the chambers tends to return the piston to said middle position, and means, controlled by the control member, for one of isolating the two chambers from said slide valves and for connecting said slide valves to the tank and to the pressure source.

10. The device according to claim 9, wherein said means for isolating the two chambers comprises a solenoid valve capable of connecting an auxiliary pipe to one of the tank and the pressure source, said auxiliary pipe being connected to the chambers via valve means which closes when the auxiliary pipe is connected to the tank, and the auxiliary pipe being connected, to controlled valve means which connects the valves to the tank when the auxiliary pipe is under pressure and which isolates them from the tank when the auxiliary pipe is connected to the tank.

11. The device according to claim 10, wherein said means for isolating the two chambers comprise an isolating valve located between each chamber and the corresponding slide valve, the isolating valves being controlled by the pressure of the pressure source to which they are connected via a solenoid valve, controlled by the control member.

* * * * *